United States Patent [19]

Von Röpenack et al.

[11] Patent Number: 4,789,446

[45] Date of Patent: Dec. 6, 1988

[54] METHOD OF PROCESSING RESIDUES FROM THE HYDROMETALLURGICAL PRODUCTION OF ZINC

[75] Inventors: Adolf Von Röpenack; Winfried Böhmer, both of Datteln; Günter Smykalla, Haltern; Volker Wiegand, Datteln, all of Fed. Rep. of Germany

[73] Assignee: Ruhr-Zink GmbH, Datteln, Fed. Rep. of Germany

[21] Appl. No.: 101,714

[22] Filed: Sep. 28, 1987

[30] Foreign Application Priority Data

Oct. 9, 1986 [DE] Fed. Rep. of Germany ....... 3634359

[51] Int. Cl.$^4$ .............................................. C25C 1/14
[52] U.S. Cl. .................................... 204/119; 75/109; 75/121; 423/140
[58] Field of Search .................. 204/119, 114; 75/109, 75/121; 423/140

[56] References Cited

U.S. PATENT DOCUMENTS 3,926,743 8/1976 Landucci et al. .................... 423/104
4,637,832 1/1987 Cammi et al. ........................ 204/119

OTHER PUBLICATIONS

"Encyclopedia of Chem. Technology", Kirk Othmer, 3rd Ed., vol. 24, pp. 817-823.

Primary Examiner—R. L. Andrews
Attorney, Agent, or Firm—Sprung Horn Kramer & Woods

[57] ABSTRACT

In conjunction with an electrolytic production of zinc, the residues are processed so that the residue is leached with cell acid at a temperature from 50° to 100° C. in such a manner that a concentration of free acid from 10 to 100 g/l is obtained at the end of the leaching. The undissolved matter is separated from the suspension, the separated matter is supplied to the acid leaching step performed in the electrolytic production of zinc, and fine-grained metallic iron is added to the solution from which the undissolved matter has been removed so that copper is precipitated. The precipitated copper is separated and the liquid phase from which the precipitated copper has been separated is supplied to one of the stages which precede the precipitation of iron in the electrolytic production of zinc.

19 Claims, 2 Drawing Sheets

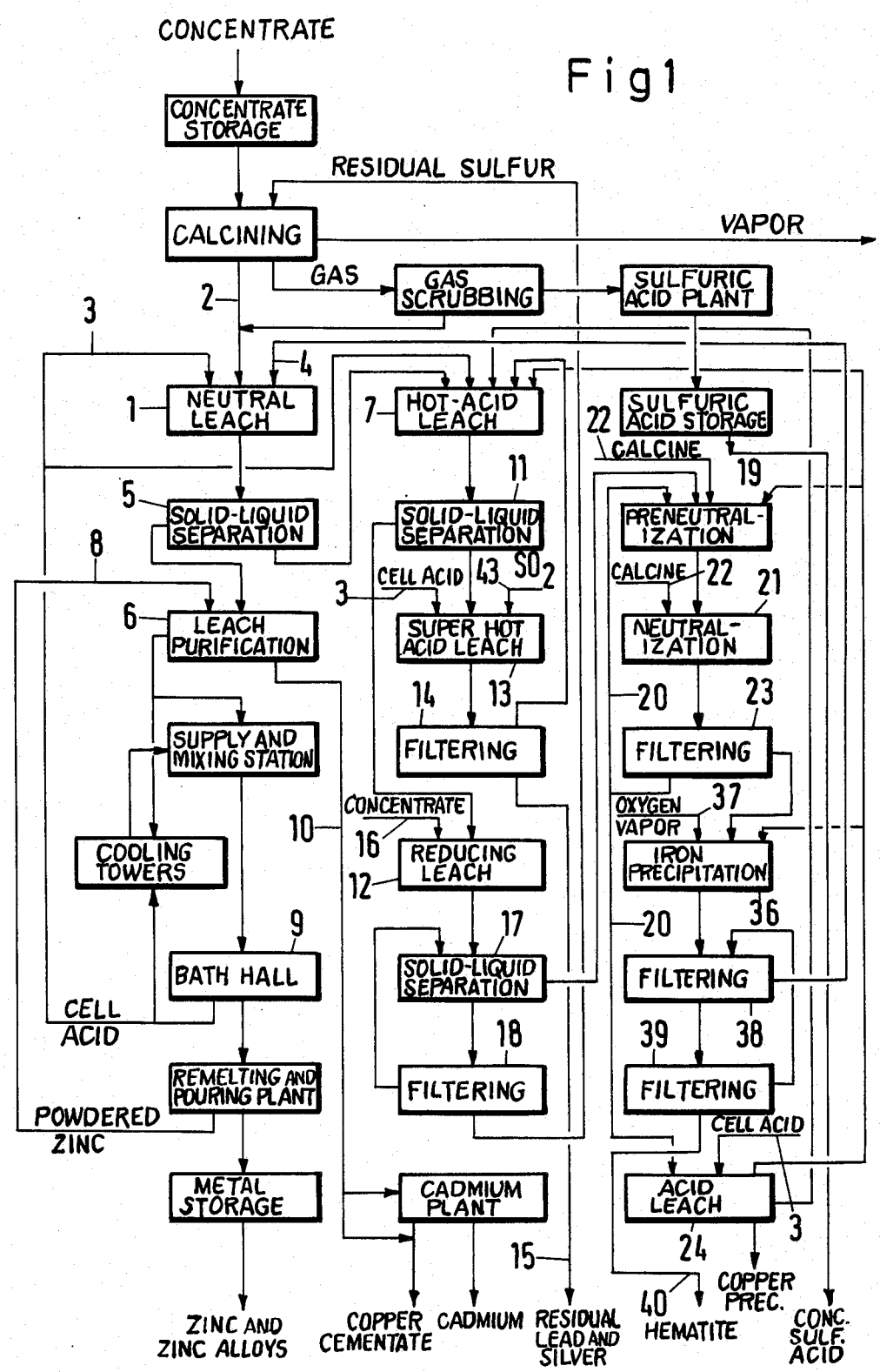

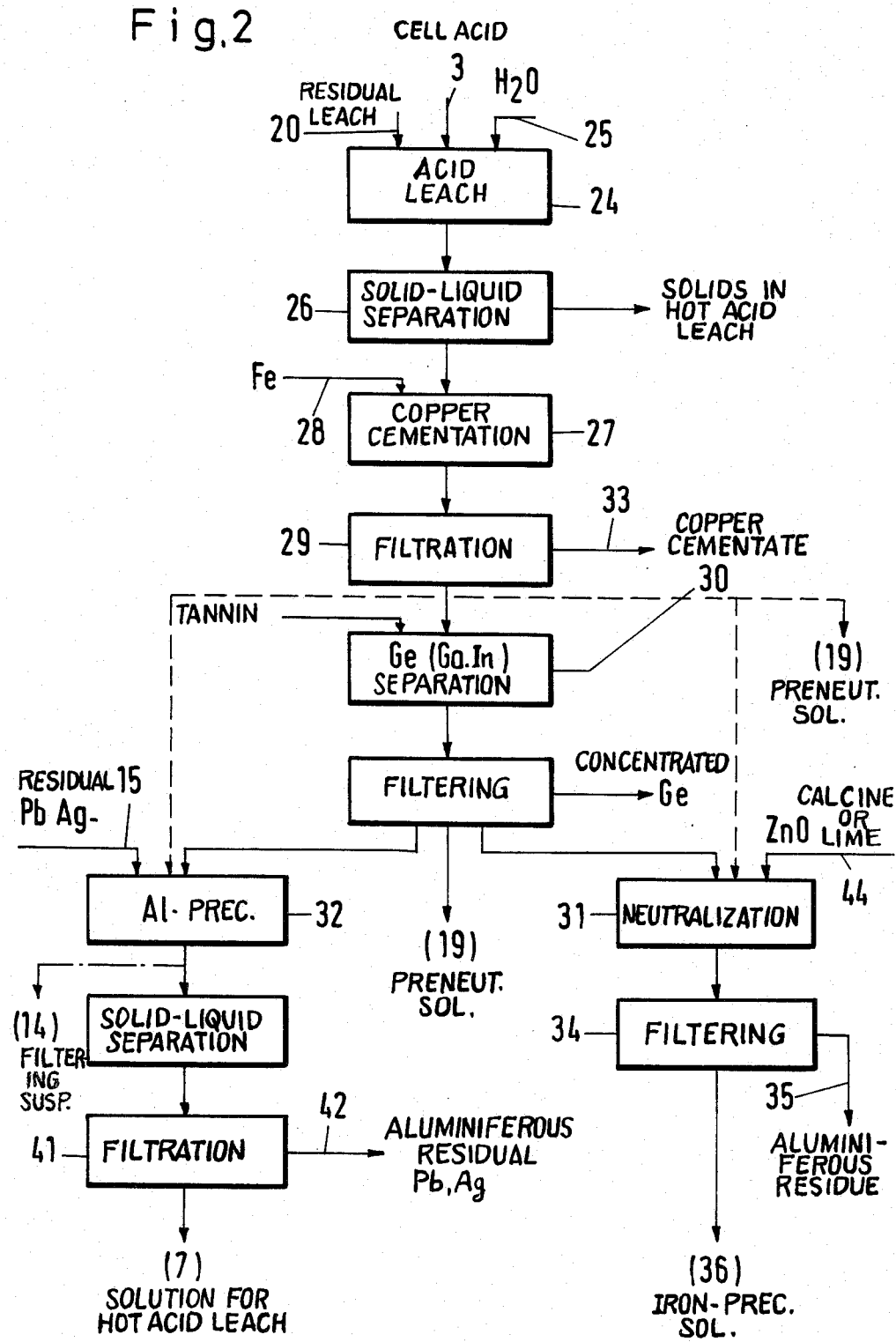

METHOD OF PROCESSING RESIDUES FROM THE HYDROMETALLURGICAL PRODUCTION OF ZINC

BACKGROUND OF THE INVENTION

This invention relates to a process of treating residues from the hydrometallurgical production of zinc, particularly from the electrolytic production of zinc, in combination with an electrolytic production of zinc.

The residues which are formed in hydrometallurgical processes can be disposed of only with difficulty and still contain valuable substances. These remarks are particularly applicable to the electrolytic production of zinc. In the preparation of the zinc sulfate solution for use in the electrolytic process, the solution is neutralized and the iron is subsequently precipitated. The residue which becomes available after that neutralization and before said precipitation contains impurities, such as Ge, Ga, In, As, Cu, Pb, $SiO_2$, $Al_2O_3$ and also contains Zn. That residue must be removed from the process in order to prevent an enriching of said impurities in the circulating system or a contamination of the precipitated iron with said impurities because such contamination would adversely affect the utilization of said iron.

In a process known from Published German Application No. 25 40 641, the roasted concentrate is initially subjected to a neutral leaching step, the resulting $ZnSO_4$ solution is supplied to the electrolytic process, and the leach residue is leached in two hot and acid steps. The first of the hot leaching steps is carried out under reducing conditions established by an addition of zinc concentrate. After an optional preneutralization, the leach residue left after said first hot leaching step is treated in the second step with a sulfuric acid solution which has a much higher concentration than the sulfuric acid solution used in the first step. Unreacted zinc sulfide concentrate and elementary sulfur are separated from the solution by flotation and the remaining Pb residue is also separated from the solution. The solution is subsequently recycled to the first hot leaching step. After the removal of the leach residue from the solution obtained in the first hot leaching step, said solution is neutralized with lime to a pH value of about 4.5. The resulting precipitate constitutes a residue, which consists mainly of $CaSO_4$ and contains the impurities described previously and must be removed from circulation. The iron contained in the remaining solution is oxidized and precipitated and the solution is then recycled to the neutral leaching step. The gypsum residue which is formed by the neutralization is highly contaminated and for this reason cannot advantageously be utilized and its disposal would result in a pollution of the environment. Besides, that gypsum still contains valuable materials.

SUMMARY OF THE INVENTION

It is an object of the invention to treat such residues left after the leaching of zinc-containing substances, so that no residue or only a very small residue will be left and that the valuable materials will be recovered as completely as possible.

That object is accomplished in accordance with the invention in that (a) the residue is leached with cell acid at a temperature from 50° to 100° C. in such a manner that the concentration of free acid is between 10 and 100 g/l at the end of the leaching, (b) the undissolved matter is separated from the suspension;

(c) the separated matter is fed to the hot acid leaching in the electrolytic production of zinc, (d) copper is precipitated by an addition of fine-grained iron metal to the solution obtained in step (b), (e) the precipitated copper is separated, and (f) the liquid phase obtained in step (e) is fed to one of the stages which precede the precipitation of iron in the electrolytic production of zinc.

The residue to be treated may primarily consist of the residue formed in the electrolytic production of zinc carried out by the same operator, where that residue is formed when the solution formed by the hot acid leaching step is neutralized before the iron is precipitated. Alternatively, residues from hydrometallurgical zinc production processes carried out by other operators may be treated. The residue formed in the electrolytic production of zinc contains precipitates of elements, such as Cu, In, Ge, Ga, and possibly contains undissolved elements, such as Cu, Ag, Pb, Zn, and may contain $Al_2O_3$ and $SiO_2$ and adhering sulfate solution. Before being further treated, the residue is suitably partly dewatered by filtering. By an addition of process liquors, the cell acid used for the acid leaching in step (a) may be so adjusted that the required acid concentration is obtained at the end of the continuous leaching. That acid concentration will result in a desirable settling rate in the succeeding thickener, in which a solid-liquid separation is effected. The thickened solid contains the insoluble constituents, such as Pb and Ag, and also contains components such as zinc ferrite and some Cu, which are only partly soluble due to the low concentration of acid. The said residue is recycled to the hot acid leaching step, in which the soluble constituents are substantially dissolved and Pb and Ag become enriched in an insoluble residue which is removed. Fine-grained iron metal is preferably added to the solution obtained by the solid-liquid separation after the acid leaching. In principle scrap iron lumps or iron pellets may also be added. The type of reactor which is most suitable will depend on the iron-bearing material which is selected. Such reactor may comprise a container provided with a stirrer or a vibrating or rocking reactor, a precipitating drum or a hopper. By the addition of metallic iron, the Cu in the acid medium can be precipitated without an increase in the pH value, which would result in a precipitation of some metal hydroxides. Also, a precipitation of Cd is substantially suppressed and $Fe^{3+}$ is reduced to $Fe^{2+}$ so that the disturbing influence of $Fe^{3+}$ on the subsequent steps will be prevented. From the point of view of cost and of metallurgical technology, the iron metal which is added may consist, for instance and preferably, of the undersize material obtained in the production of sponge iron or of the magnetic fraction of iron-bearing slags. The cement copper is suitably filtered off in filter presses and is washed and dewatered and is subsequently available for further processing. The decopperized solution will then contain Zn and $Fe^{2+}$ and will also contain the valuable metals In, Ge, Ga in a highly increased concentration, depending on their initial concentrations.

In accordance with a further preferred feature, aluminum is precipitated from a partial stream or from the stream of the solution obtained in step (e) before said partial stream or stream is fed to step (f).

The precipitated aluminum is separated so that an enriching of aluminum in the electrolytic production of zinc will be avoided.

In accordance with a further preferred feature, the aluminum is precipitated by a neutralization to a pH value from 4.0 to 5.0, the precipitated solids are filtered off and the resulting solution is fed to step (f). In that case only a small amount of residue will be obtained and will contain a major portion of the aluminum content. The solution can be neutralized with roasted concentrate, zinc oxide or lime. The residue left after a neutralization with roasted concentrate also contains lead and silver as valuable metals and may be processed further, e.g., in a lead smelter or alternatively, may be dumped. The neutralizing process will be selected depending on the nature of the further processing and of the process in which the valuable metals are subsequently recovered. The solids are removed by filtration or centrifugation and are washed and sufficiently dewatered for the further processing. The solution is fed to one of the steps before the precipitation of iron in the electrolytic production of zinc or is preferably fed directly to the iron-precipitating stage.

In accordance with a further preferred feature, the neutralization is effected at a temperature from 70° to 95° C. and to a pH value from 4.0 to 4.5. This will result in a highly effective precipitation and the solids can readily be removed by filtration or centrifugation.

In accordance with a further preferred feature, the aluminum is precipitated by an addition of Pb-Ag residue and a treatment in an autoclave at temperature above 150° C., preferably from 180° to 210° C., the resulting suspension is fed to step (f) and the precipitated aluminum is separated together with the Pb-Ag residue formed in the electrolytic production of zinc. As a result, the aluminum is introduced into the lead-silver residue from the electrolytic production of zinc so that no additional residue is formed and the lead-silver residue which remains will be more highly concentrated. Instead of lead-silver residue, lead sulfate or alkaline earth metal sulfates may be added to precipitate aluminum but said substances must be purchased from external sources and the use of alkaline earth metal sulfates will result in a residue which contains contaminating substances, which must be removed by a further processing or dumping.

In accordance with a further preferred feature, the aluminum is precipitated by an addition of Pb-Ag residue and a treatment in an autoclave at temperatures above 150° C., preferably from 180° to 210° C., the precipitated aluminum is separated together with the Ag-Pb residue which has been added, and the resulting solution is fed to step (f). That processing will afford the advantage that the suspension need not be transferred over long distances and the aluminum which is obtained will constitute a relatively small solids volume.

In accordance with a further preferred feature, the aluminum is precipitated by an addition of organic substances, such as molasses, and a treatment in an autoclave at temperatures above 150° C., preferably from 180° to 210° C., the precipitated solids are separated and the resulting solution is fed to step (f). Although aluminum is obtained together with alien substances in that processing, it can be easily dumped or may be processed further.

In accordance with a further preferred feature, step (a) is carried out at a temperature from 70° to 95° C. and results in a final concentration of free acid from 30 to 50 g/l. These conditions will result in particularly good settling properties.

In accordance with a further preferred feature, the solids content in step (a) amounts to 60 to 150 g/l. This will result in good leaching and settling conditions.

In accordance with a further preferred feature, the undissolved matter is separated from the suspension formed in step (b) in the presence of polyalcohols or gelatin to precipitate $SiO_2$. As a result, a very large part of the $SiO_2$ will enter the residue and will be available in an easily filterable form. The addition may alternatively be made to the hot acid leaching step carried out in the electrolytic production of zinc and the $SiO_2$ will then enter the lead-silver residue. But in that case a larger amount of reagents will have to be added.

In accordance with a preferred further feature, the cement copper which has been precipitated in step (d) and separated in step (e) is recycled to the precipitation tank until a solids concentration from 100 to 300 g/l has been reached, and the temperature is adjusted in the range from 75° to 95° C. In that case the solids can readily be filtered off, washed and dewatered.

In accordance with a further preferred feature, the separation of copper from the solution obtained in step (e) is succeeded by a separation of germanium, indium and gallium before step (f). The metals may be recovered by liquid-liquid extraction or by ion exchange or by precipitation with suitable reagents. If aluminum is to be precipitated, germanium, indium and gallium will be separated first. Thereafter the said metals or compounds thereof will be obtained in a highly concentrated form.

In accordance with a further preferred feature, at least one of the elements indium, germanium or gallium is recovered from the residue which contains precipitated aluminum. The recovery is effected by an additional leaching step.

In accordance with a further preferred feature, the leach residue fed to step (a) is obtained by a hot acid leaching of the residue left after the neutral leaching of the roasted zinc concentrate, which hot acid leaching is effected at a temperature from 70° C. and the boiling point of the solution, a separation of the undissolved matter consisting of a lead-silver residue preferably with an addition of gelatin or polyalcohol, a reducing leaching of the solution with an addition of sphalerite, a separation of the undissolved matter, a recycling of said undissolved matter to the roasting step, a preneutralization of the solution by an addition of calcine or leached residue, a neutralization by an addition of calcine, a separation of the leached residue, a precipitation of the iron contained in the solution and a recycling of the solution to the neutral leaching step. As a result of that processing, the valuable materials will be contained in a very small amount of residue so that the residue can be processed with a very small expenditure. The solution which is obtained as a result of the processing and the solids which are obtained after the acid leaching can be recycled in a highly favorable manner to the electrolytic production of zinc and the entire process will result in a utilisable residue which must not necessarily be dumped. The addition of gelatin or polyalcohol will promote the separation of $SiO_2$.

In accordance with a preferred further feature, the neutralization is effected after a preneutralization to a pH value from 4.0 to 5.0. This will result in favorable conditions for the precipitation of the residue and for its separation from the solution. Said results can be produced particularly effectively at a pH value from 4.0 to 4.5.

In accordance with a further preferred feature, iron is precipitated as hematite. In that case, the precipitated iron will have a high iron content and a low zinc content so that it has a high potential for further processing.

In accordance with a further preferred feature, the undissolved matter which has been separated after the hot acid leaching is leached in a superhot acid leaching step at temperatures from 90° to 130° C., preferably from 95° to 110° C., with cell acid which contains sulfuric acid in a concentration from 130 to 160 g/l, preferably 140 to 150 g/l, and with the introduction of $SO_2$, the undissolved solids thus obtained are separated and removed as a lead-silver residue, and the solution is recycled to the hot acid leaching step. Through this step the dissolution of iron and other elements is promoted and will result in a lead-silver residue which contains iron and said other elements in smaller concentrations.

The invention will be explained more in detail with reference to flow diagrams and to an example.

BRIEF DESCRIPTION OF THE DRAWINGS

FIG. 1 is a flow diagram illustrating an electrolytic production of zinc and showing only diagrammatically how the residue is processed in accordance with the invention by acid leaching.

FIG. 2 is a flow diagram illustrating details of processing of the residue.

Roasted concentrate 2, cell acid 3 and solution 4 from the iron-precipitating stage are fed to the neutral leaching stage 1. This is followed by a solid-liquid separation in stage 5. The overflow is fed to the solution-purifying stage 6. The leach residue is fed to the hot acid leaching stage 7. Zinc dust 8 is added to the solution-purifying stage 6. The purified zinc sulfate solution is fed to the electrolysis stage 9 and the cement copper 10 is processed further. The hot acid leaching stage 7 is followed by a solid-liquid separation in stage 11. The overflow is fed to a reducing leaching stage 12 and the solids are fed to the superhot acid leaching stage 13, in which leaching is effected with an addition of cell acid 3 and $SO_2$ 43. After a filtration in stage 14 the lead-silver residue 15 is fed to a further processing stage. The reducing leaching in stage 12 is effected with an addition of zinc blend 16 and is followed by a solid-liquid separation in stage 17. After a succeeding filtration in stage 18, the sulfur residue is recycled to the roasting stage. The overflow from the solid-liquid separation stage 17 is fed to the preneutralizing stage 19, which is supplied with roasted concentrate 22 or with residue 20 from the filtration stage 23. The resulting suspension is fed to the neutralizing stage 21. Roasted concentrate 22 is also supplied to the neutralizing stage 21. After a succeeding filtration in stage 23, the residue 20 is supplied in part to the acid leaching stage 24 and in part to the preneutralizing stage 19. The filtrate is supplied to the iron-precipitating stage 36.

Cell acid 3 and water 25 are supplied to the acid leaching stage 24. After a solid-liquid separation in stage 26, the overflow is supplied to the copper-precipitating stage 27. The solids are recycled to the hot acid leaching stage 7. Fine-grained metallic iron 28 is added to the copper-precipitating stage 27.

The cement copper 33 which has been filtered off in the filtering stage 29 is supplied to a further processing. The filtrate is further processed as such (indicated by dotted lines) or is previously fed to a stage 30 for a recovery of Ge, Ga, In. In both cases the filtrate can be further treated in various ways.

All or part of the solution can be supplied to the preneutralizing stage 19.

All or part of the solution may be fed to the neutralizing stage 31, which is also supplied with roasted concentrate, ZnO or lime 44. After the filtration in stage 34 the Al-containing residue 35 is further processed or is dumped and the filtrate is supplied to the iron-precipitating stage 36.

All or part of the solution may be supplied to the Al-precipitating stage 32, where a part of the Pb-Ag residue 15 is added. After a succeeding solid-liquid separation and filtration in stage 41, the precipitated aluminum together with the Pb-Ag residue 42 is supplied to a further processing stage. The filtrate is supplied to the hot leaching stage 7. After the Pb-Ag residue 15 has been added to the Al-precipitating stage 32, the resulting suspension may be supplied (dash-dot line) to the filtering stage 14 of the plant for the electrolytic production of zinc, where the Al-containing Pb-Ag residue is separated together with the major quantity of the Pb-Ag residue 15.

Oxygen and steam 37 are supplied to the iron-precipitating stage 36 of the plant for the electrolytic production of zinc. After a solid-liquid separation in stage 38, the overflow is supplied to the neutral leaching stage 1. The solids are supplied to a filtering stage 39 and the hematite residue 40 is supplied to a further processing.

EXAMPLE

Solids which have been formed in the neutralizing stage of the plant for the electrolytic production of zinc and have been filtered off were subjected to an acid leaching at 85° C. with cell acid for 1 hour with stirring. The cell acid was used in such a quantity that an acid concentration of about 30 g/l was obtained. Before the filtration, 0.1 g of a polyalcohol was added per liter of suspension. The leached residue was filtered off. Fine-grained metallic iron was added to the filtrate in order to precipitate the copper. The cement copper was filtered off and the filtrate was stirred in the neutralizing stage at 80° C. and was supplied with roasted concentrate in such a quantity that a pH of 5 was obtained. The residue was filtered off.

Solids from the neutralizing stage of the plant for the electrolytic production of zinc 30.2% Zn, 20.5% Fe, 2.6% Pb, 3.0% Cu, 3.2% $SiO_2$, 3.0% $Al_2O_3$ Leached residue 16.5% Zn, 30.3% Fe, 8.2% Pb, 0.9% Cu, 9.8% $SiO_2$, 2.5% $Al_2O_3$ Filtered solution obtained by leaching 95 g/l Zn, 10.5 g/l $Fe^{+++}$, 6.8 g/l $Fe^{++}$, 5.6 g/l Cu, 0.4 g/l $SiO_2$, 4.5 g/l $Al_2O_3$, 34 g/l $H_2SO_4$ Cement copper 51.5% Cu, 4.4% Fe, 3.6% Zn, 5.6% $SiO_2$, 2.0% $Al_2O_3$ Filtered solution after precipitation of copper 93 g/l Zn, 18.5 g/l Fe++, 0.3 g/l Fe+++, 0.6 g/l Cu, 0.1 g/l SiO$_2$, 4.5 g/l Al$_2$O$_3$, 30 g/l H$_2$SO$_4$.

Residue formed by neutralization 28.5% Zn, 16.3% Fe, 2.5% Pb, 1.9% Cu, 1.7% SiO$_2$, 6.5% Al$_2$O$_3$ Filtered solution after neutralization 116 g/l Zn, 20 g/l Fe++, 0.1 g/l Fe+++, 0.2 g/l Cu, 0.1 g/l SiO$_2$, 0.3 g/l Al$_2$O$_3$ An aqueous suspension of calcium hydroxide was added to the filtrate obtained after the precipitation of copper until a pH value of 4.5 had been obtained. The contaminated gypsum which was precipitated was filtered off.

Filtered solution obtained after the precipitation of copper 103 g/l Zn, 21.5 g/l Fe++, 0.2 g/l Fe+++, 0.1 g/l Cu, 0.2 g/l SiO$_2$, 3.9 g/l Al$_2$O$_3$ Gypsum 3.6% Zn, 0.6% Fe, 0.1% Cu, 4.0% Al$_2$O$_3$ Filtered solution obtained after the precipitation of gypsum 105 g/l Zn, 21 g/l Fe++, 0.1 g/l Fe+++, 0.1 g/l Cu, 0.1 g/l SiO$_2$, 0.2 g/l Al$_2$O$_3$ 175 g of filter-moist lead-silver residue was added in an autoclave to 2.5 l of the filtered solution obtained after the precipitation of copper. The suspension was heated to 200° C. with stirring and was held at that temperature for 1 hour, also with stirring. The suspension was cooled for pressure relief and then filtered. The filtered solids contained almost all of the aluminum which had previously been in solution.

Filtered solution obtained after the precipitation of copper 77 g/l Zn, 20.3 g/l Fe++, 0.6 g/l Fe+++, 0.1 g/l Cu, 7.6 g/l Al$_2$O$_3$, 34 g/l H$_2$SO$_4$ Lead-silver residue 22.5% Pb, 0.19% Ag, 9.3% Fe, 2.5% Zn, 2.0% Al$_2$O$_3$, 13.1% SiO$_2$ Filtered solution obtained after the precipitation of aluminum 73 g/l Zn, 19.8 g/l Fe++, 0.4 g/l Fe+++, 0.1 g/l Cu, 0.7 g/l Al$_2$O$_3$, 38 g/l H$_2$SO$_4$ Residue obtained after the precipitation of aluminum 19.0% Pb, 0.17% Ag, 6.1% Fe, 10.7% Al$_2$O$_3$, 2.3% Zn The advantages afforded by the invention reside in that residues left after a leaching of zinc-containing substances can be processed with a low expenditure in such a manner that an unusable residue is not formed or only a very small residue is formed and that the valuable materials contained in the residue can be recovered from small quantities of material. As a result, an electrolytic production of zinc can be carried out in such a manner that unusable residues will not be formed.

What is claimed is:

1. A process of treating residues from the hydrometallurgical production of zinc, comprising the steps of:
   (a) electrolytically producing zinc comprising leaching a zinc containing material with a hot sulfuric acid to obtain a zinc sulfate solution, purifying the zinc sulfate solution by precipitating out iron and electrolyzing the purified solution resulting in a zinc deposition and a spent cell acid,
   (b) leaching copper containing residue from a hydrometallurgical production of zinc with spent cell acid from step (a) at a temperature from 50° to 100° C. to obtain a concentration of free acid between 10 and 100 g/l at the end of the leaching,
   (c) separating undissolved matter from the suspension to obtain solution;
   (d) feeding the separated matter to the hot acid leaching in step (a),
   (e) precipitating copper by an addition of fine-grained iron metal to the solution obtained in step (c),
   (f) separating the precipitated copper to leave a liquid phase, and
   (g) feeding the liquid phase obtained in step (f) to step (a) prior to the precipitation of iron.

2. A process according to claim 1, further comprising precipitating aluminum from at least part of the liquid phase obtained in step (f) and before feeding same to step (g).

3. A process according to claim 2, wherein the aluminum is precipitated by a neutralization to a pH value from 4.0 to 5.0, the precipitated solids are filtered off and the resulting solution is fed in step (g).

4. A process according to claim 3, wherein neutralization is effected at a temperature from 70° to 95° C. and to a pH value from 4.0 to 4.5.

5. A process according to claim 2, wherein Pb-Ag residue is produced during the purifying in step (a) and wherein the aluminum is precipitated by an addition of the Pb-Ag residue and a treatment in an autoclave at temperatures above 150° C. to form a suspension, the suspension is fed in step (g) and the precipitated aluminum is separated together with the Pb-Ag residue.

6. A process according to claim 2, wherein Pb-Ag residue is produced during the purifying in step (a) and wherein the aluminum is precipitated by an addition of the Pb-Ag residue and a treatment in an autoclave at temperatures above 150° C., the precipitated aluminum is separated together with the Ag-Pb residue to form a solution, and the solution is fed in step (g).

7. A process according to claim 2, wherein the aluminum is precipitated by adding molasses, and a treatment in an autoclave at temperatures above 150° C., the precipitated solids are separated and the resulting solution is fed in step (g).

8. A process according to claim 1, wherein step (b) is carried out at a temperature from 70° to 95° C. and results in a final concentration of free acid from 30 to 50 g/l.

9. A process according to claim 1, wherein the solids content in step (b) is from 60 to 150 g/l.

10. A process according to claim 1, wherein the undissolved matter is separated from the suspension formed in step (c) in the presence of polyalcohols or gelatin to precipitate SiO$_2$.

11. A process according to claim 1, wherein the copper which has been precipitated in step (e) and separated in step (f) is recycled to a precipitation tank until a solids concentration from 100 to 300 g/l has been reached, and the temperature is adjusted in the range from 70° to 95° C.

12. A process according to claim 1, wherein the separation of copper from the solution obtained in step (g).

13. A process according to claim 2, wherein at least one of the elements indium, germanium or gallium is recovered from the residue which contains precipitated aluminum.

14. A process according to claim 1, wherein step (a) includes roasting zinc concentrate and a hot acid leaching of residue after a neutral leaching of the roasted zinc concentrate, wherein the hot acid leaching is effected at a temperature from 70° C. to the boiling point of the solution, a separation of the undissolved matter consisting of a lead-silver residue with an addition of gelatin or polyalcohol, a reducing leaching of the solution with an addition of zinc blend, a separation of the undissolved matter, a recycling of said undissolved matter to the roasting step, a preneutralization of the solution by an addition of calcine or leach residue, a neutralization by an addition of calcine, a separation of the leach residue, a precipitation of the iron contained in the solution and a recycling of the solution to the neutral leaching step.

15. A process according to claim 14, wherein the neutralization is effected after a preneutralization to a pH value from 4.0 to 5.0.

16. A process according to claim 14 or 15, wherein iron is precipitated as hematite.

17. A process according to claim 14, wherein the undissolved matter which has been separated after the hot acid leaching is leached in a superhot acid leaching step at temperatures from 90° to 130° C., with cell acid which contains sulfuric acid in a concentration from 130 to 160 g/l, and with the introduction of $SO_2$, the undissolved solids thus obtained are separated and removed as a lead-silver residue, and the solution is recycled to the hot acid leaching step.

18. A process according to claim 17, wherein the cell acid contains sulfuric acid in a concentration of 140 to 150 g/l and the superhot leading step is at a temperature from 90° to 110° C.

19. A process according to claim 5, 6 or 7, wherein the autoclave temperature is from 180° to 210° C.

* * * * *

UNITED STATES PATENT AND TRADEMARK OFFICE
CERTIFICATE OF CORRECTION

PATENT NO. : 4,789,446
DATED : December 6, 1988
INVENTOR(S) : Adolf Von Röpenack, et al It is certified that error appears in the above-identified patent and that said Letters Patent is hereby corrected as shown below:

Col. 3, line 34      After "autoclave at" delete "temperature" and substitute --temperatures--

Col. 8, line 51      After "by adding" insert --organic substances such as--

Col. 9, line 12      After "step" insert --(f) is succeeded by a separation of germanium indium and gallium before step--

Signed and Sealed this

Twenty-sixth Day of December, 1989

Attest:

JEFFREY M. SAMUELS

Attesting Officer      Acting Commissioner of Patents and Trademarks